Jan. 30, 1951   H. O. PETERSON   2,539,673
FREQUENCY MEASURING SYSTEM
Filed April 20, 1944   5 Sheets-Sheet 1

INVENTOR
HAROLD O. PETERSON.
BY H. G. Grover
ATTORNEY

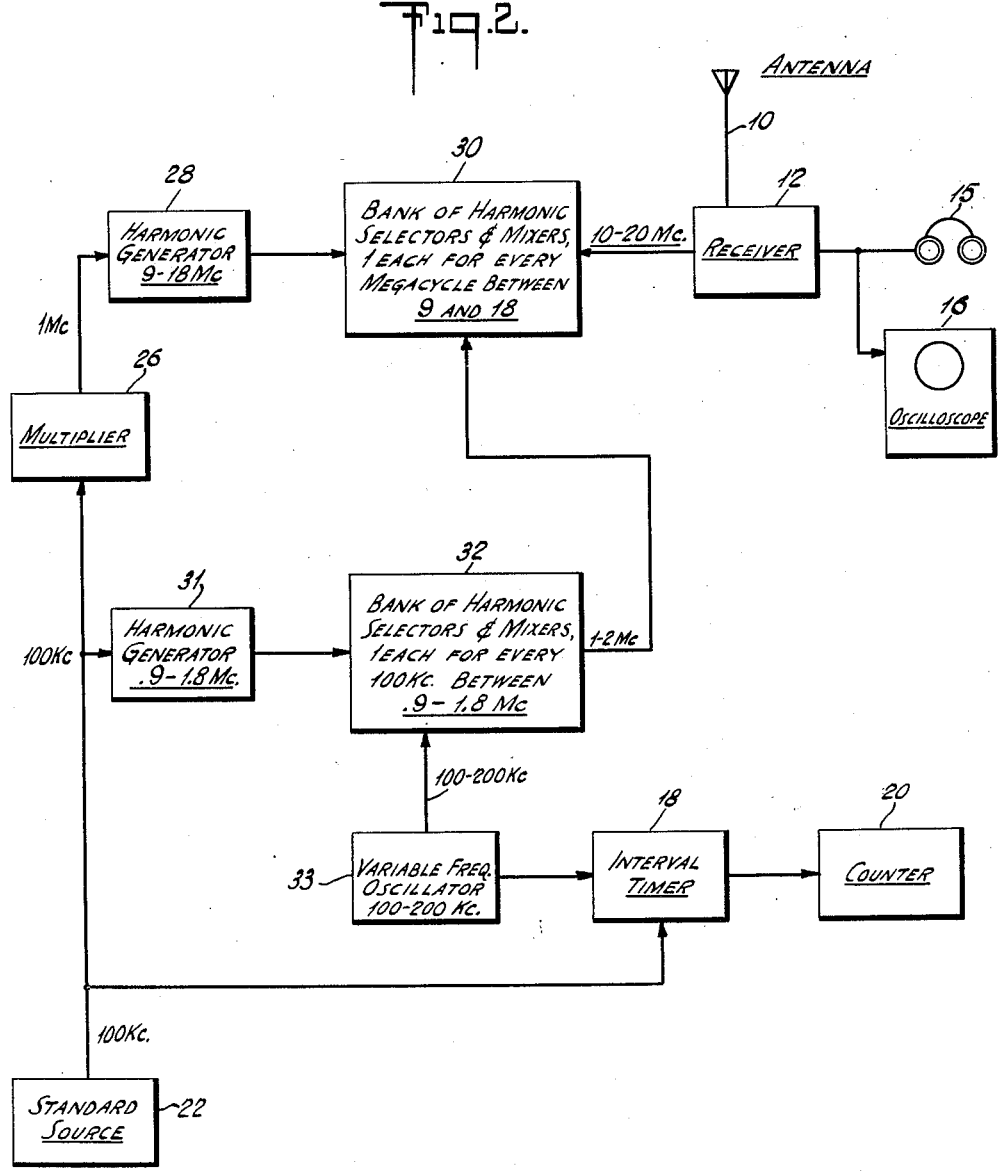

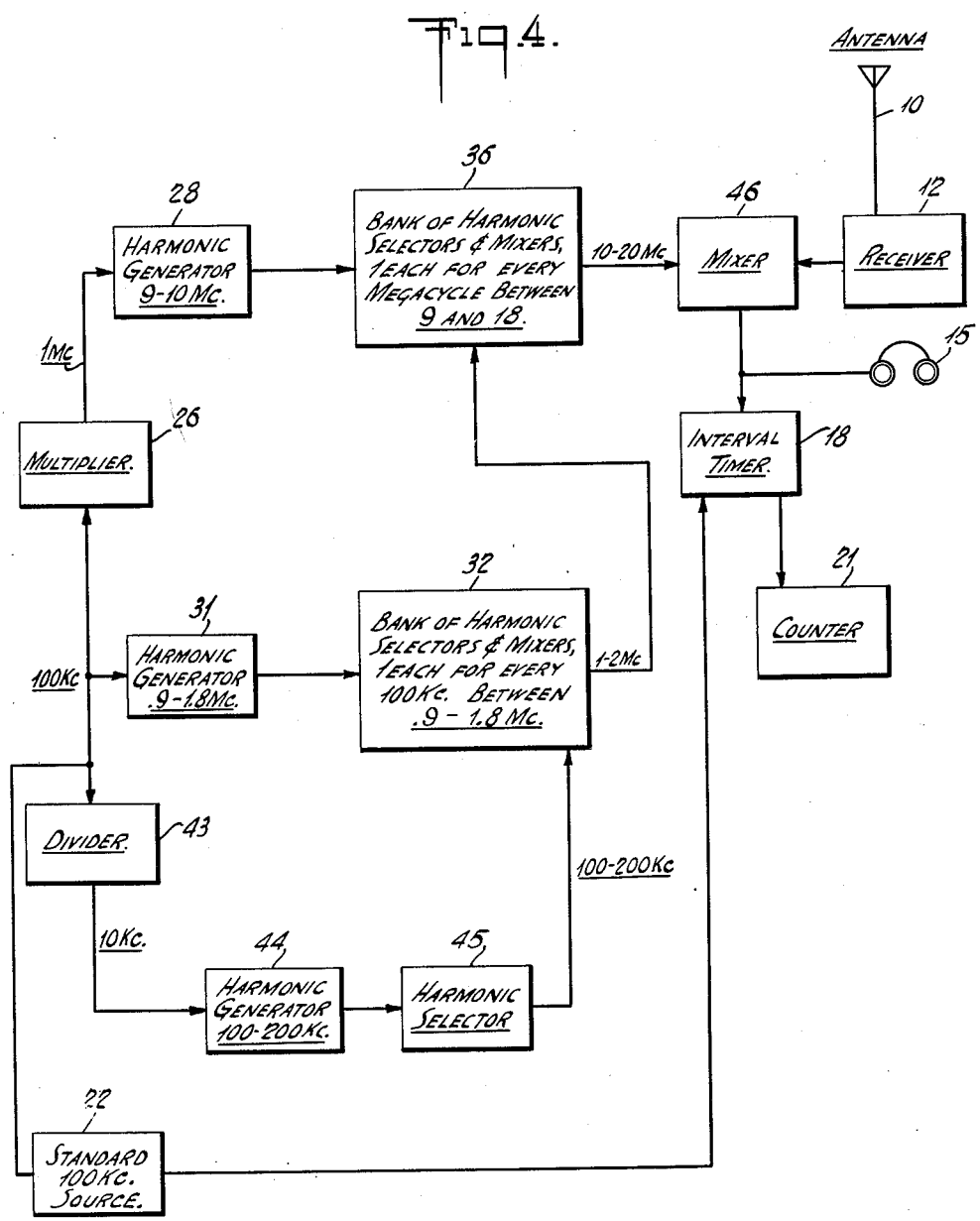

Jan. 30, 1951   H. O. PETERSON   2,539,673
FREQUENCY MEASURING SYSTEM
Filed April 20, 1944   5 Sheets—Sheet 4
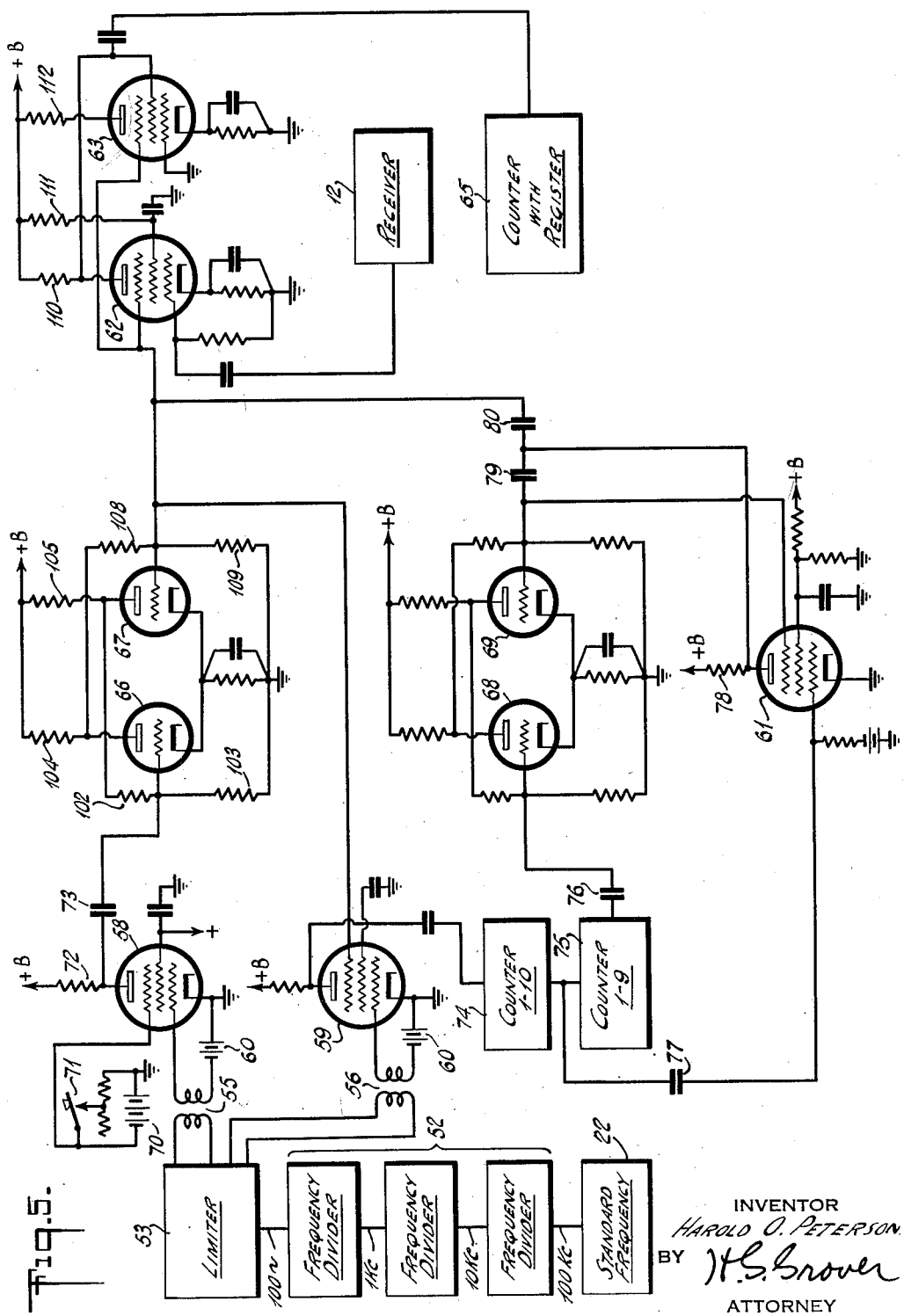
INVENTOR
HAROLD O. PETERSON
BY H. G. Grover
ATTORNEY Jan. 30, 1951          H. O. PETERSON          2,539,673
                   FREQUENCY MEASURING SYSTEM
Filed April 20, 1944                          5 Sheets-Sheet 5
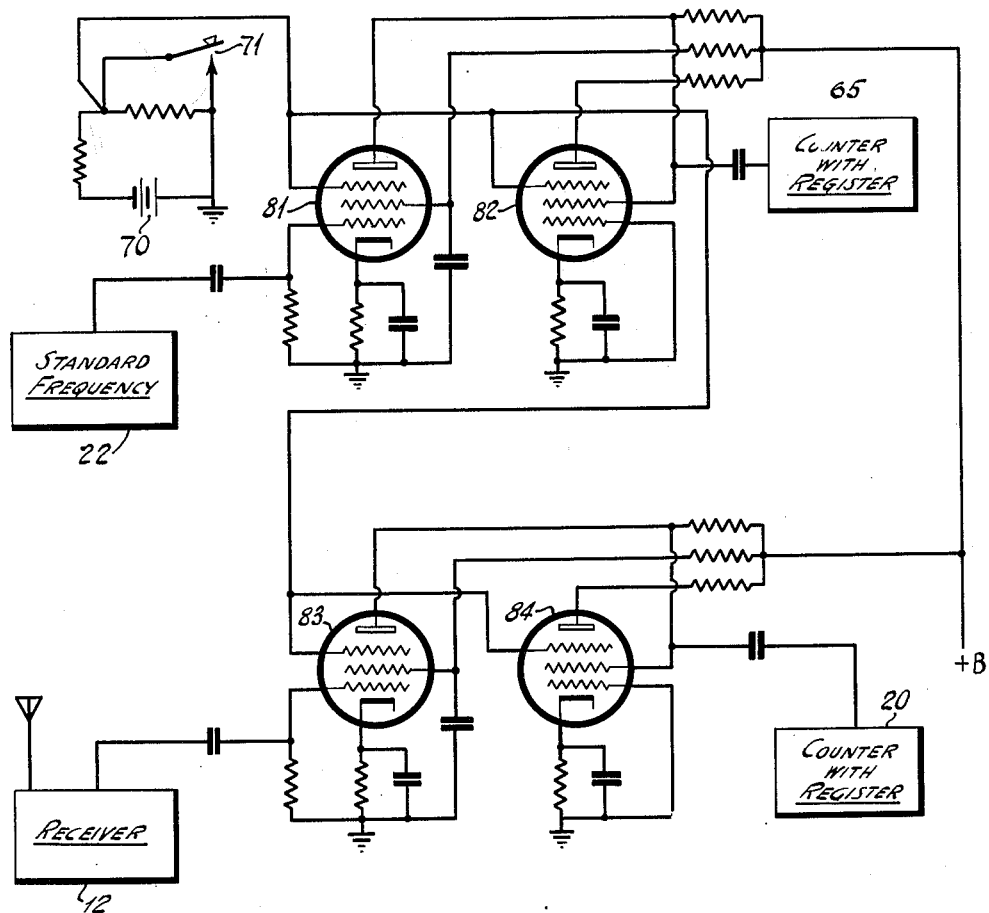
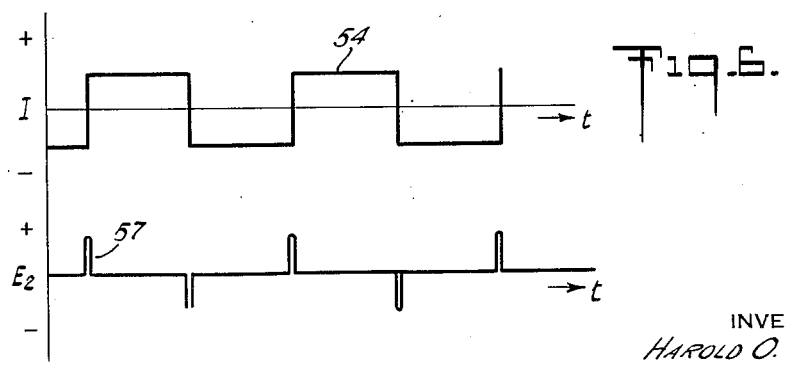
INVENTOR
HAROLD O. PETERSON.
ATTORNEY Patented Jan. 30, 1951

2,539,673

UNITED STATES PATENT OFFICE 2,539,673

FREQUENCY MEASURING SYSTEM

Harold O. Peterson, Riverhead, N. Y., assignor to Radio Corporation of America, a corporation of Delaware Application April 20, 1944, Serial No. 531,896

8 Claims. (Cl. 250—39)

1

The present invention relates to frequency measuring systems and, more particularly, to a system whereby the frequency of the radio frequency wave may be determined with extreme accuracy.

An object of the present invention is the measurement of the frequency of radio frequency waves.

A further object of the present invention is the provision of a radio frequency measuring system which is so arranged that the frequency of the wave may be directly read from calibrations on the device.

A further object is the provision of a frequency measuring system which has an accuracy better than one part in ten million.

The foregoing objects, and others which may appear from the following detailed description, are attained by providing a high speed electronic counter-mechanism which counts the number of cycles of radio frequency energy in an accurately determined time period.

The radio frequency wave whose frequency is to be determined may either be directly applied to the counter or it may be beat against another wave of accurately known frequency and the frequency of the resultant beat wave accurately counted by the electronic counter mechanism. In the second instance, the accurately known wave may be obtained by selecting certain decimally related harmonics of a wave from a standard frequency source and combining these harmonics to provide an accurately known frequency.

The present invention will be more completely understood by reference to the following detailed description which is accompanied by a drawing in which:

Figures 3 and 4 illustrate in block diagram form further modifications of the present invention;

Figure 5 illustrates a form of interval timer useful in practicing the present invention;

Figure 6 is a family of curves illustrating the operation of a portion of the device shown in Figure 5; and Figure 7 illustrates a further modification of the invention.

Figure 1:
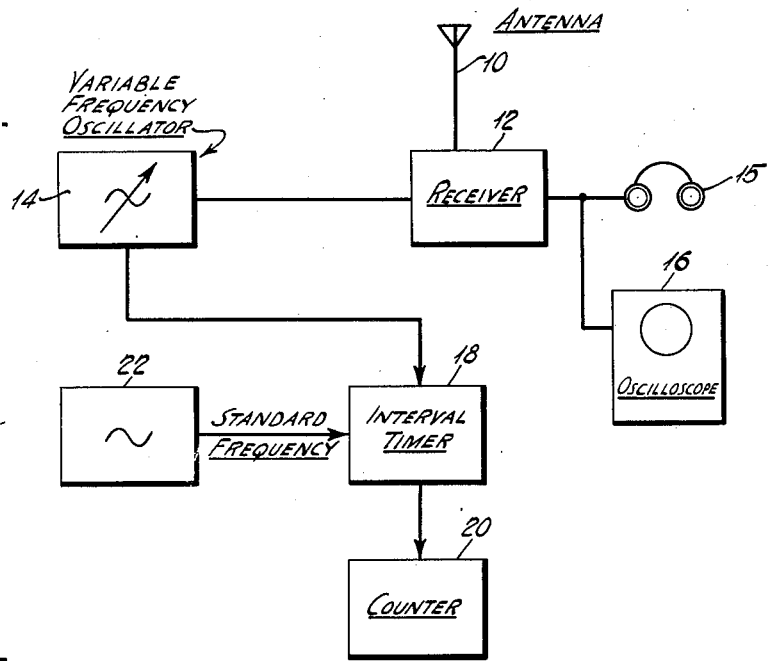
Figure 1 illustrates in block diagram form an embodiment of the present invention.

In Figure 1 there is shown, generally, one system of measuring the frequency of a signal wave. The incoming signal is picked by by aerial 10 and applied to the input of receiver 12. A variable frequency local oscillator 14 also feeds a radio frequency wave into the receiver 12. The frequency of the variable frequency oscillator 14 is adjusted to exactly the same frequency as that of the incoming signal wave. This adjustment to equality may be made in a well known manner by the assistance of earphones 15, cathode ray oscilloscope 16, or other conventional beat indicating means.

The output of the variable frequency oscillator 14 is also arranged to be transmitted through an interval timing device 18, the output of which is applied to a counting device 20. The counting device must be one which operates at very high speeds. A known type of counting device operates at such speeds that it actually counts the number of cycles of radio frequency energy in a given interval of time, and operates on the principle that each incoming cycle causes an increment of electric charge to be added to a first condenser.

Circuits are so arranged that after ten such incremented charges have been added to the first condenser, means are actuated to supply a unit charge to a second condenser. At the same time, the accumulated charge on the first condenser is dissipated, thus conditioning it for a repetition of the described action. The second device after receiving ten charges actuates a third device to supply a unit charge to a third condenser, and so on, until a low enough frequency of operation is obtained that it may be followed by the conventional mechanical counters.

Preferably, the counter device is so constructed that as each charge is added to one of the charge maintaining condensers, one of a row of 9 glow tubes associated with each condenser is illuminated. The rows of glow tubes may be arranged in vertical rows like an adding machine keyboard so that if, for example, eight charges are applied to one condenser, eight of the glow tubes associated with that condenser will be illuminated. Then as the charge on the condenser is dissipated, all of the glow tubes associated therewith are extinguished. By the use of this type of counter device the number of cycles of input energy in a known interval of time may be accurately counted, thus giving an accurate determination of the frequency of the variable frequency oscillator 14.

It is believed that the foregoing description of a satisfactory type of counter circuit is sufficient for a clear understanding of the present invention. A more complete disclosure may be had by reference to application Serial No. 459,404, filed September 23, 1942, by L. E. Flory and G. A. Morton, now U. S. Patent 2,442,403 issued June 1, 1948, and application Serial No. 467,032, filed November 26, 1942, by L. E. Flory, now U. S. Patent 2,410,156 issued November 29, 1946.

The interval timer is preferably constructed somewhat similarly to the counter mechanism, and is so arranged as to close the circuit between oscillator 14 and counter 20, count off a predetermined number of cycles of energy from the standard frequency source 22 and then open the circuit between variable frequency oscillator 14 and counter 20. For example, if the standard frequency source 22 is a 100 kilocycle generator, the interval timer in measuring one second of time, after having closed the counting circuit, may count off 100,000 cycles from the frequency standard 22 and then open the counting circuit. Then the reading of counter 20 gives directly the frequency of oscillator 14 to one part in 100,000.

If desired, a harmonic of the variable frequency oscillator 14 may be used for matching the unknown frequency applied to antenna 10. The fundamental frequency of the variable frequency oscillator 14 may be, as before, transmitted through the interval timer. In that case the frequency would be determined by multiplying the measured frequency of the variable frequency oscillator by the known order of the harmonic used.

Figure 2:
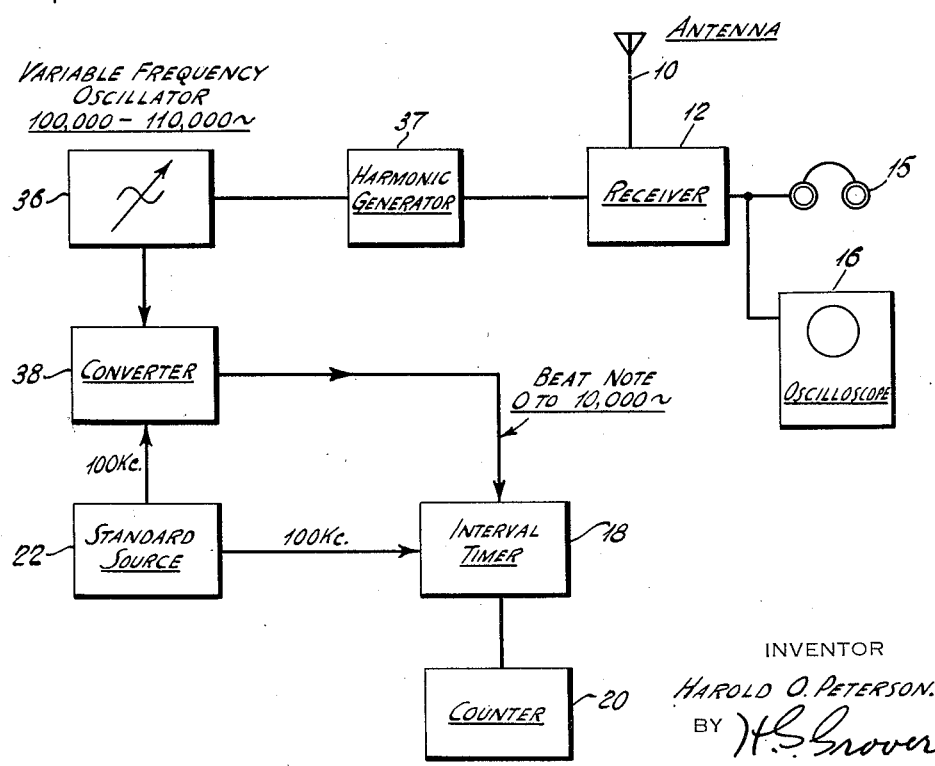
Figure 2 illustrates in block diagram form a modification of the present invention.

Figure 2 shows a modification of the present invention utilizing the interval timer and counter device of Figure 1 in conjunction with the variable frequency generator system described in my prior application Serial No. 489,085, filed May 29, 1943, now U. S. Patent 2,380,868, issued July 17, 1945.

In the arrangement of Figure 2, there is shown a 100 kilocycle per second standard frequency source 22. The output from the 100 kc./sec. standard source is applied to multiplier 26, the output of which is at a frequency of one megacycle per second. The one megacycle per second wave is applied to a harmonic generator 28 having output frequencies at every megacycle from 9 to 18 mc., inclusive. The output from the harmonic generator 28 is applied to a bank of harmonic selectors and mixers 30. This bank of selectors and mixers is here shown as a single block instead of as a plurality of separate circuits in my prior application Serial No. 489,085, now U. S. Patent 2,380,868, issued July 31, 1945, and to which reference may be had for a more complete description of the operation and function of the harmonic selectors and mixers.

Briefly, the function of the bank of selectors and mixers 30 is to select one of the harmonics generated by generator 28 and mix an incoming wave from a source to be later described with this selected harmonic. A further selection takes place after the mixing to select only the desired one of the products of the mixing. Thus, if for example, the 9 mc. harmonic from harmonic generator 28 is mixed with a one mc. wave from the other source to be later described, the output frequency selected will be 10 mc. This 10 mc. wave is applied to receiver 12 where it is combined with the incoming signal from antenna 10. An indication of the beat obtained between these two waves is observed by means of phones 15 or oscilloscope 16.

The 100 kc. standard source 22 has a second output directly to harmonic generator 31 which generates harmonics from .9 to 1.8 mc. A second bank 32 of harmonic selectors and mixers is connected to the output of harmonic generator 31 whereby any one of the harmonics generated by the generator 31 may be mixed with an incoming wave from variable frequency oscillator 33 to provide a definitely known and accurately determined frequency in the range of from 1 to 2 mc. This frequency is applied to the first bank of harmonics, selectors and mixers 30. The variable frequency oscillator 33 also has an output through interval timer 18 to counter 20. The interval timer 18 is actuated from the 100 kc. standard source 22 as described with reference to Figure 1.

In operating the modification of Figure 2, the output of variable frequency oscillator 33 is combined with two decimally related selected harmonics of the local frequency standard source 22 to produce a frequency which, when beat with the incoming frequency in receiver 12, provides a zero beat indication at the head phones 15 or oscilloscope 16. The actual frequency generated by the variable frequency oscillator 33 is determined by counting the number of cycles of the wave in an accurately predetermined time interval such as one second, through the use of interval timer 18 and counter 20.

A further modification of the present invention is shown in Figure 3 wherein a harmonic of a variable frequency oscillator 36 is matched against the unknown frequency. Since a harmonic of the variable frequency is used, the oscillator is not required to cover a large frequency range. The output of variable frequency oscillator 36 is mixed with a constant frequency from a standard frequency source 22 in a converter 38 so as to produce a beat note which is applied through timer 18 to counter 20, as outlined above.

The output of variable frequency oscillator 36 is also applied to a harmonic generator 37, and one of the resultant harmonics is combined in receiver 12 with the incoming frequency picked up by antenna 10. Which of the harmonics is used may be readily determined by even a rough calibration of receiver 12. Using a structure as shown in Figure 3, it is possible to measure any frequency in the range between 1 mc. and 20 mcs. by using the proper harmonics from variable frequency generator 36, said generator being variable in frequency only over a band of 10,000 cycles.

The unknown frequency is determined by multiplying the frequency of the variable frequency oscillator 36 (which is accurately determined by counter 20) by the order of the harmonic used. In some cases it may be convenient to have more than one frequency range in the variable frequency oscillator 36. For example, the variable frequency oscillator 36 may cover the ranges of 10 to 11 kc., 100 to 110 kc. and 1 to 1.1 mc. With the switching of the ranges in the variable frequency oscillator 36, means may also be provided for switching the other branch of the converter input 38 to different outputs of the local frequency standard 22, that is, for example, to 10, 100 kc. and 1 mc. output.

A further modification of the present invention is shown in Figure 4 wherein the same system of obtaining and mixing accurately known harmonics of a standard frequency source 22 is employed to obtain an accurately known local wave. The process has been set forth in some detail with reference to Figure 2 and will not, therefore, be completely described with reference to Figure 4.

However, in the present modification the output from standard frequency source 22 is additionally applied to a divider 43 to obtain a 10 kc. wave. The output from divider 43 is applied to a harmonic generator 44, generating harmonics at 10 kc. intervals from 100 to 200 kc. One of these harmonics may be selected by harmonic selector 45 for application to the first bank of harmonic selectors and mixers 32 for mixing with a selected harmonic from generator 31.

It will be noted by comparing Figures 2 and 4 that the frequency divider 43, harmonic generator 44 and harmonic selector 45 are substituted for the calibrated oscillator 33 of Figure 2. Selection at 45, 32 and 36 of appropriate harmonics provides, in effect, a frequency source supplying to an input of mixer 46 accurately known frequencies in steps of 10 kc. over the entire band from 10 to 20 mc. One of these frequencies, when mixed in mixer 46 with the incoming signal from receiver 12, produces an audible beat indication in phones 15 since there is only 10 kc. difference between any pair of adjacent frequencies. The audible beat note is applied through interval timer 18 to counter 20 and may readily be measured. Since there will always be at least two frequencies which produce an audible beat which may be heard in the head phones, a comparison of the results of mixing a frequency which is higher or lower than the incoming waves avoids any ambiguity as to whether the frequency indicated by counter 21 is to be added to or subtracted from the reading given by the calibrated selector switches on selectors 30, 32 and 45.

In any of the previously described modifications, if it is desired to cover frequencies outside of the range from 10 to 20 mc., which has been discussed for purposes of illustration, the range may be extended, as described in my previous application Serial No. 489,085, now Patent 2,380,868 by mixing with the output of the bank of harmonic selectors and mixers 30, for example, a 10 mc. wave. By choosing the proper one of the sum or difference frequencies resulting from this additional mixing, the range may be extended to cover 1 to 10 mc. or 20 to 30 mc. The range may be further extended by utilizing harmonics of the 1 to 30 mc. range so far described.

The interval timer shown in Figure 5 consists of a gate circuit through which the unknown frequency is passed for a known length of time. In Figure 5 the gate is represented by vacuum tubes 62 and 63 with their associated connections. The number of cycles of the unknown frequency passed by the gate in a known length of time is indicated on the register of the counter 65.

The gate circuit is characterized in that the mutual conductance of tube 62 is varied to either permit or prevent the passage of the unknown frequency, while tube 63 acts to maintain the anode current constant through resistor 110. The anode of tube 62 and the screen of tube 63 are connected together, while the screen of tube 62 and the anode of tube 63 are supplied from B+ through resistors 111 and 112, respectively. When a negative potential is applied to both suppressor grids, the conductance of tube 62 is reduced and the anode voltage tends to rise by the reduction of the current through resistor 110. But the current through resistor 112 is similarly reduced, the difference in current passing to the screen of tube 63, exactly replacing the decrease through 110 due to the reduction in anode current of tube 62. If the suppressor grids are so biased as to permit tube 62 to act as an amplifier, the signal at unknown frequency appears across resistor 110 in the usual way.

The interval timer shown in Figure 5 measures an interval of time by counting a predetermined number of cycles of a standard frequency. In the example given, the standard frequency is 100 cycles which is derived from the 100 kc. frequency standard 22 by means of frequency dividers 52. This process is well known in the art.

The 100 cycle standard frequency is passed through a current limiter 53 which results in an output wave form such as shown by curve 54 in Figure 6. When current having this type of wave form is passed through the primary of transformer 55 and transformer 56, there will be induced a secondary voltage having the wave form shown at 57 in Figure 6. It will be noted that the secondary voltage shown at 56 in Figure 6 consists of short pulses, alternately positive and negative. If transformers 55 and 56 are properly designed, these pulses can be made to have a length of about 1 microsecond.

Vacuum tubes 58 and 59 are biased negative so that they normally do not transmit plate current. The cut-off bias is provided in part by grid biasing batteries 60, and in part by a negative bias applied to the suppressor grids. In the case of tube 58, the suppressor grid bias is supplied from battery 70, while the suppressor grid bias for tube 59 is provided by a connection to the circuit involving tubes 66 and 67.

Tubes 66 and 67 are connected in a "flip-flop" circuit. Tubes 68 and 69 are also connected in a "flip-flop" circuit. This "flip-flop" circuit has the characteristic that either one of the two tubes may conduct current, but while it is conducting current the voltage drop in its plate load circuit biases the other tube to cut-off. That is, if it is assumed that tube 66, for example, is conducting, there will be a voltage drop through its plate resistor 104. The grid of tube 67 is connected to a voltage divider 108, 109, from the plate end of resistor 104 to ground. The constants are so arranged that the resultant bias on tube 67 biases it to cut-off.

Now, if a short pulse of voltage in the proper direction is applied to the grid of tube 66, the other tube will be caused to draw plate current through resistor 105 and bias tube 66 to cut-off through a voltage divider arrangement 202, 203 similar to 108, 109. Since the "flip-flop" circuits involving tubes 68 and 69 operate in a similar manner, the circuit elements involved with these tubes have not been separately identified by reference numerals.

We will assume that the circuits are in a condition which closes the gate to the unknown frequency. In this condition, vacuum tube 66 is drawing plate current which causes tubes 68, 62, 63 and 59 to be biased to cut-off. Vacuum tube 58 is receiving positive pulses, such as shown at 57 in Figure 6, on its grid, but no plate current flows because of the negative cut-off voltage applied to the suppressor by battery 70. Now, if the operator closes contactor 71 for a brief instant, the negative bias is removed from the suppressor and an impulse of plate current will be drawn when the next positive pulse is applied to the control grid by transformer 55. This pulse of plate current flowing through resistor 72 results in a negative pulse being transmitted through capacitor 73 to the control grid of tube 66. This is sufficient to cause the "flip-flop" circuit to "flip" over to the condition where vacuum tube 67 is drawing plate current and tube 66 is biased to cut-off. When this has happened, the suppressor grids of tubes 59, 62 and 63 are no longer biased to cut-off. Thus the unknown frequency is allowed to pass by the gate tubes 62 and 63, and pulses are transmitted by tube 59 into the counter chain 74 and 75. This process continues as long as vacuum tube 67 continues to draw current, which will be until it receives a pulse of the proper polarity to shut it off.

We will also assume that while the interval timing procedure gets under way, vacuum tube 68 is drawing plate current which biases the suppressor of tube 61 to cut-off. Now, every time counter 74 reaches a count of 10, an impulse is transmitted into counter 75. Counter 75 counts the impulses which it receives. Thus, when counter 75 reaches a count of 9, it means that 90 pulses have been counted by counter 74. When counter 75 reaches a count of 9 it causes a negative pulse to be transmitted through condenser 76 which stops the flow of plate current in tube 68, causing the circuit to "flip" over so that tube 69 draws plate current. This removes the negative cut-off bias from the suppressor of tube 61 so that when counter 74 next reaches a count of 10 its pulse transmitted through condenser 77 will cause a negative pulse in the plate circuit 78 which is transmitted through coupling condensers 79 and 80. This negative pulse causes another reversal of the two "flip-flop" circuits so that tubes 67 and 69 immediately cease drawing plate current, and tubes 66 and 68 simultaneously commence drawing plate current which causes the suppressors of tubes 62, 63 and 59 to be again biased to cut-off. Thus, the gate has been opened for a period of time accurately determined by the counting of a predetermined number of cycles of a known frequency.

A slightly different way of determining the unknown frequency is shown in Figure 7. In this case, two gates are provided by the circuits associated with tubes 81, 82 and 83, 84. These operate in the same way as described heretofore with reference to tubes 62, 63, and the operation will not therefore be again described, nor is it believed necessary to identify in detail the circuit connections to these tubes. Both gates are simultaneously opened by closing a switch or telegraph key 71. Opening switch or key 71 closes both gates simultaneously, thus the standard frequency is transmitted into counter 65 and the unknown frequency is transmitted into counter 29 for an equal interval of time. Since the standard frequency is known, the unknown frequency is readily calculated from the readings of the two counters. The unknown frequency would be equal to the standard frequency multiplied by the reading of counter 29 divided by the reading of counter 65.

While I have illustrated a particular embodiment of the present invention, it should be clearly understood that it is not limited thereto since many modifications may be made in the several elements employed and in their arrangement without departing from the spirit and scope of the invention.

Having now described my invention, what I claim as new and desire to have protected by Letters Patent is:

1. An arrangement for determining the frequency of an alternating wave including a single source of oscillations of precisely known frequency, means coupled to said source to produce a periodic wave of frequency precisely proportional to the frequency of said oscillations, means to produce a difference wave having a frequency equal to the difference in frequency between said periodic and alternating waves, a counter arranged to count the alternations of said difference wave, and gating means coupled to said source to apply said difference wave to said counter for a precisely determined time interval whereby the frequency of said alternating wave is the algebraic sum of the number of alternations counted divided by said time interval and the frequency of said periodic wave.

2. An arrangement for determining the frequency of an alternating wave including a single source of oscillations of precisely known frequency, means coupled to said source to produce a periodic wave of frequency precisely proportional to the frequency of said oscillations, means to mix said periodic wave and said alternating wave to produce an alternating current having a frequency equal to the difference in frequency between said waves, a counter arranged to count the alternations of said alternating current, and switching means coupled to said source to couple said counter to said mixer for a precisely determined time interval whereby the frequency of said alternating wave is the algebraic sum of the number of alternations counted divided by said time interval and the frequency of said periodic wave.

3. An arrangement for determining the frequency of an alternating wave including a single source of oscillations of precisely fixed frequency, means coupled to said source to produce a periodic wave of frequency integrally proportional to the frequency of said oscillations, a mixer, means to apply said periodic wave and alternating wave to said mixer to produce an alternating current having a frequency equal to the difference in frequency between said waves, a counter arranged to count the alternations of said alternating current, and gating means coupled to said source to couple said counter to said mixer for a precisely determined time interval whereby the frequency of said alternating wave is the algebraic sum of the number of alternations counted divided by said time interval and the frequency of said periodic wave.

4. An arrangement for determining the frequency of an alternating wave including a single source of oscillations of precisely fixed frequency, harmonic generators having decimally related output characteristics coupled to said source to produce a periodic wave of frequency decimally proportional to the frequency of said oscillations and lower than the frequency of said alternating wave, a mixer, means to apply said periodic wave and said alternating wave to said mixer to produce an alternating current having a frequency equal to the difference in frequency between said waves, a counter arranged to count the alternations of said alternating current, and gating means coupled to said source to couple said counter to said mixer for a precisely determined time interval whereby the frequency of said alternating wave is the arithmetic sum of the number of alternations counted divided by said time interval and the frequency of said periodic wave.

5. An arrangement for determining the frequency of an alternating wave including a single source of oscillations of precisely fixed frequency, means coupled to said source to produce a periodic wave of frequency precisely proportional to the frequency of said oscillations, a mixer, means to apply said periodic wave and said alternating wave to said mixer to produce an alternating current having a frequency equal to the difference in frequency between said waves, a counter arranged to count the alternations of said alternating current, a gating circuit having counting means therein coupled to said source to count a predetermined number of cycles of said oscillations to precisely determine a time interval and further means responsive to said counting means to couple said counter to said mixing circuit for said time interval, whereby the frequency of said alternating wave is the algebraic sum of the number of alternations counted divided by said time interval and the frequency of said periodic wave.

6. The method of determining the frequency of an alternating wave including the steps of producing oscillations of precisely known frequency, producing a periodic wave having a frequency precisely proportional to the frequency of said oscillations and of the order of the frequency of said alternating wave, mixing said alternating wave and said periodic wave to produce an alternating current having a frequency equal to the difference in frequency between said waves, determining a time interval proportional to the period of said oscillations, and determining the number of cycles of said alternating current occurring during said time interval, whereby the frequency of said alternating wave is the algebraic sum of said number of cycles divided by said time interval and the frequency of said periodic wave.

7. The method of determining the frequency of an alternating wave including the steps of producing oscillations of precisely known frequency, producing a periodic wave having a frequency precisely proportional to the frequency of said oscillations and of the order of the frequency of said alternating wave, producing a difference wave having a frequency equal to the difference in frequency between said alternating and said periodic waves, determining a time interval integrally proportional to the period of said oscillations, and determining the number of cycles of said difference wave occurring during said time interval, whereby the frequency of said alternating wave is the algebraic sum of said number of cycles divided by said time interval and the frequency of said periodic wave.

8. The method of determining the frequency of an alternating wave including the steps of producing oscillations of precisely known frequency, producing a periodic wave having a frequency precisely proportional to the frequency of said oscillations and of the order of the frequency of said alternating wave, generating a further wave having a frequency decimally related to said periodic wave, combining said periodic and said further waves to produce an exact periodic wave, beating said exact periodic wave against said alternating wave to produce an alternating current having a frequency equal to the difference in frequency between said alternating wave and said exact periodic wave, determining a time interval integrally proportional to the period of said oscillations, and determining the number of cycles of said alternating current occurring during said time interval, whereby the frequency of said alternating wave is the algebraic sum of said number of cycles divided by said time interval and the frequency of said periodic wave.

HAROLD O. PETERSON.

REFERENCES CITED

The following references are of record in the file of this patent:

UNITED STATES PATENTS

| Number | Name | Date |
| --- | --- | --- |
| 1,966,230 | Andrew | July 10, 1934 |
| 1,982,340 | Forbes | Nov. 22, 1934 |
| 2,019,503 | Page | Nov. 5, 1935 |
| 2,186,182 | Stocker et al. | Jan. 9, 1940 |
| 2,321,315 | Peterson et al. | June 8, 1943 |
| 2,380,288 | Bligh | July 10, 1945 |
| 2,405,597 | Miller | Aug. 13, 1946 |

FOREIGN PATENTS

| Number | Country | Date |
| --- | --- | --- |
| 355,705 | Great Britain | Aug. 24, 1931 |